E. G. CHENOWETH, J. J. ACKER & G. A. HULL.
UNDERFRAME FOR FREIGHT CARS.
APPLICATION FILED MAY 13, 1914.
1,122,254.
Patented Dec. 29, 1914.
4 SHEETS—SHEET 4.
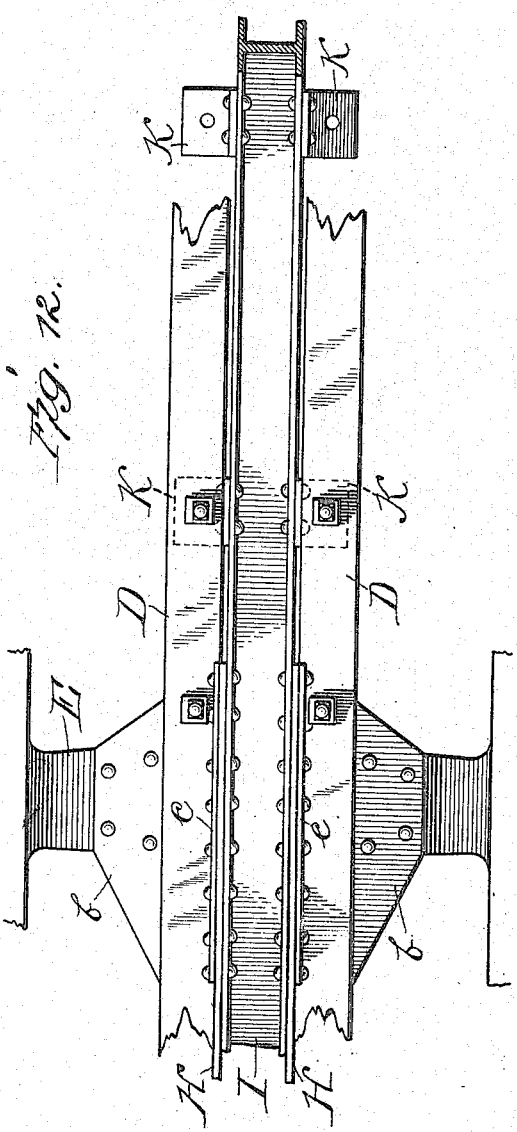
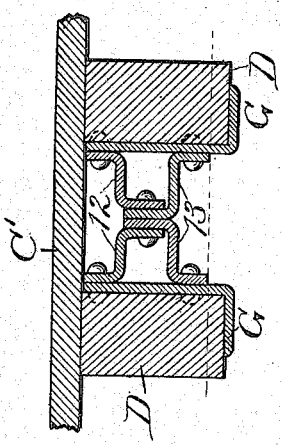
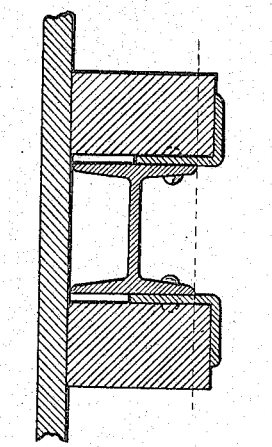
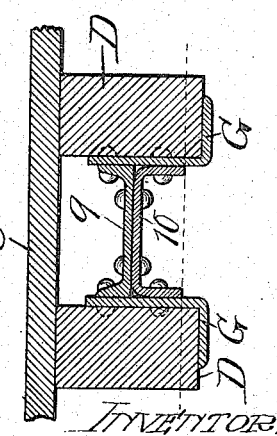
WITNESSES:
Wm Harold Eickelman.
Florence Mitchell
INVENTORS:
Edwin G. Chenoweth,
Julius J. Acker, and
George A. Hull.
By Frank D. Thomason
ATTORNEY.

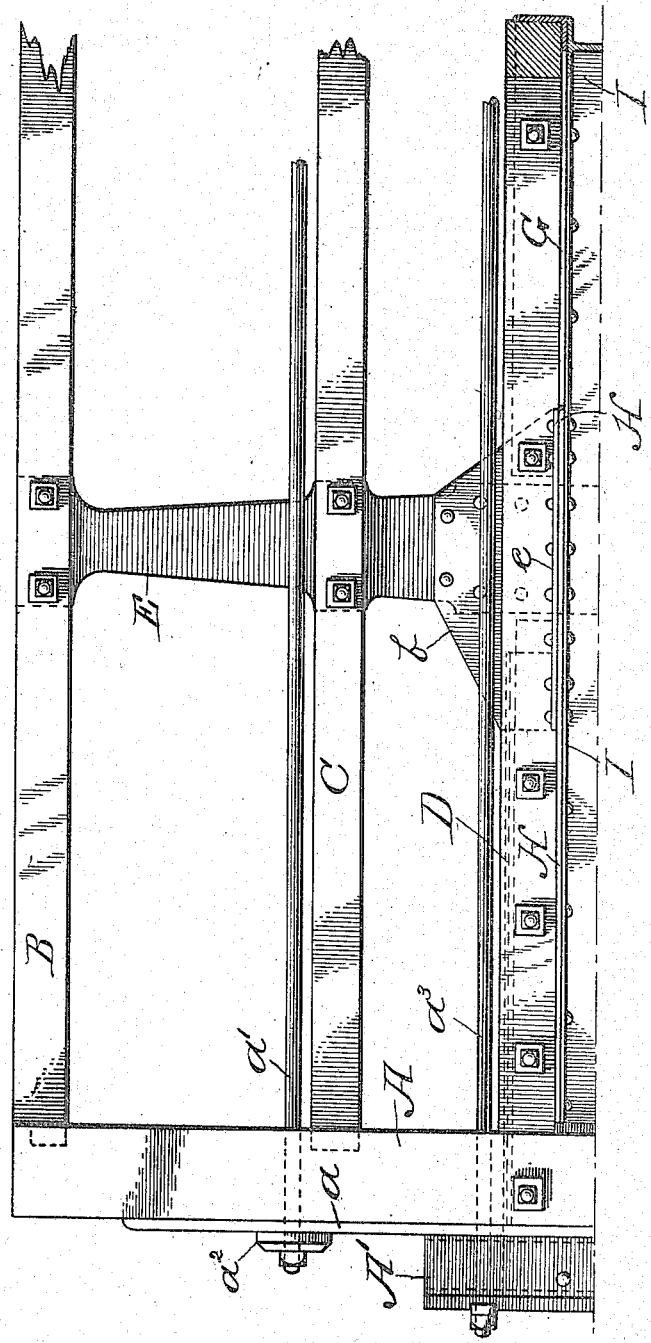

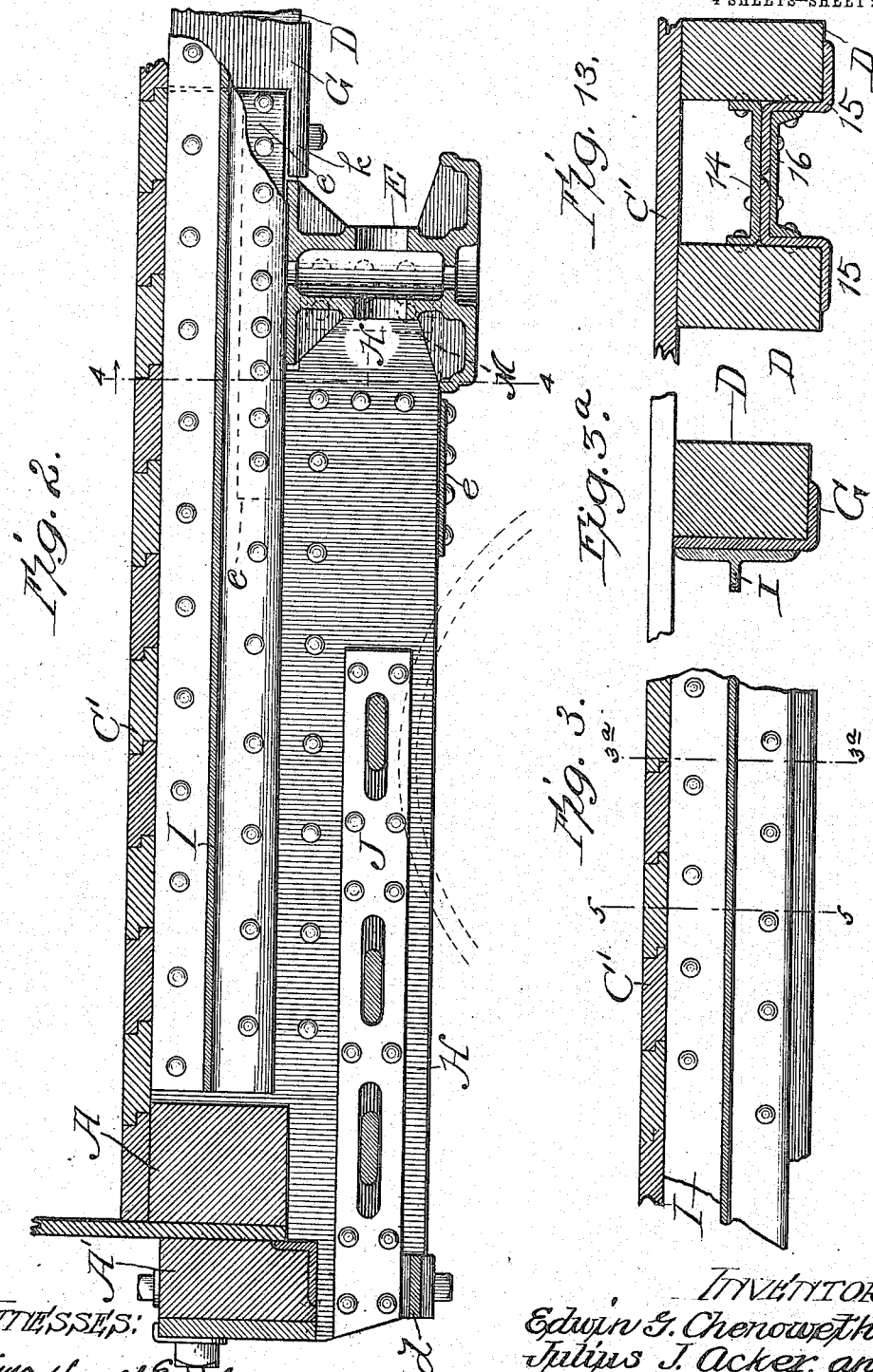

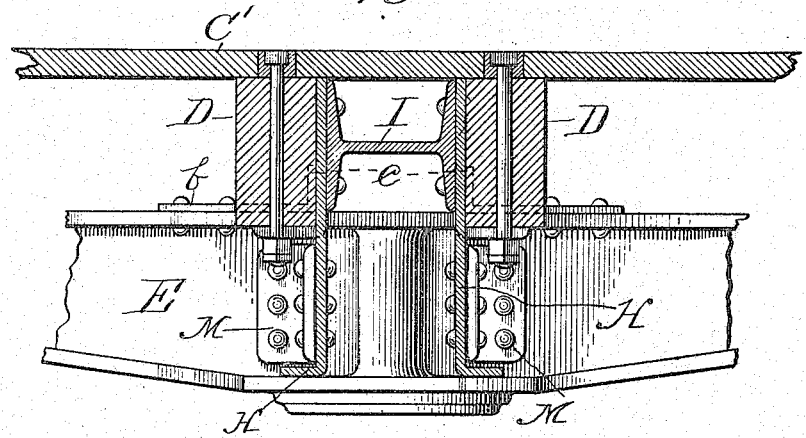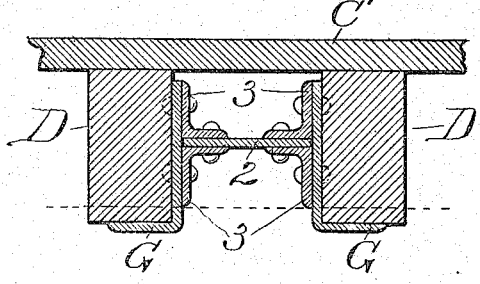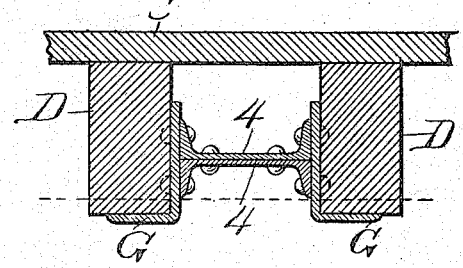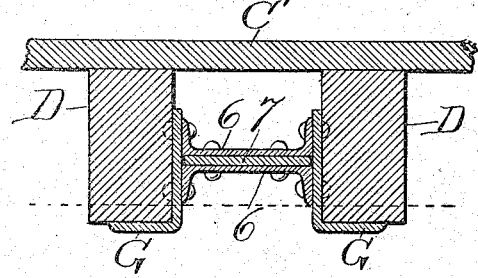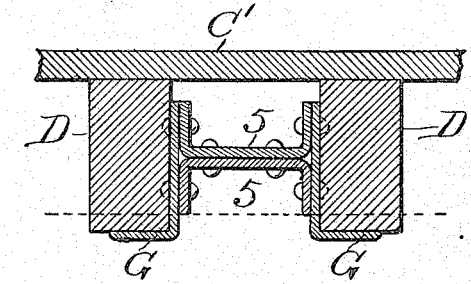

UNITED STATES PATENT OFFICE.

EDWIN G. CHENOWETH, OF BLUE ISLAND, JULIUS J. ACKER, OF CHICAGO, AND GEORGE A. HULL, OF MOLINE, ILLINOIS.

UNDERFRAME FOR FREIGHT-CARS.

1,122,254.

Specification of Letters Patent.

Patented Dec. 29, 1914.

Application filed May 13, 1914. Serial No. 838,192.

*To all whom it may concern:*

Be it known that we, EDWIN G. CHENOWETH, JULIUS J. ACKER, and GEORGE A. HULL, citizens of the United States, residing at Blue Island, in the county of Cook; Chicago, in the county of Cook, and Moline, in the county of Rock Island, respectively, all in the State of Illinois, have invented new and useful Improvements in Underframes for Freight-Cars, of which the following is a full, clear, and exact description.

Our invention relates to underframes of cars, and particularly to cars having wooden superstructures.

The greatest strain to which a freight car is subjected is along the line of its back-bone or center-sill, and, therefore, the greatest reason for the preference now being displayed for steel cars is due to the steel construction of its center-sill. The weight of an all steel freight car and the increased cost of transporting the same make it desirable to provide an improved underframe for cars that will permit the use of a wooden superstructure, and thus greatly decrease the weight of the car without greatly diminishing the strength of the same, or in other words to produce the most effective maximum strength consistent with the greatest lightness of the car, and thus reduce running expense.

The object of our invention is to greatly strengthen the double wooden center-sill of a freight car possessing a wooden superstructure by means that not only strengthen each member of the said center-sill, but unite them into practically a single center-sill, capable of resisting both longitudinal, transverse and load strains. These and other advantages we obtain by the means hereinafter fully described and as particularly pointed out in the claims.

In the drawings: Figure 1 is a plan view of half of an end portion of a car underframe embodying our invention. Fig. 2 is a vertical longitudinal central section therethrough. Fig. 3 is a continuation of the vertical longitudinal central section, shown in Fig. 2, illustrating the construction of the portion of the underframe located between the bolster thereof. Fig. 3$^a$ is a transverse section taken on dotted line 3$^a$—3$^a$, Fig. 3. Fig. 4 is a transverse vertical section of the same, taken on dotted line 4—4, Fig. 2. Figs. 5, 6, 7, 8, 9, 10 and 11 are, respectively, transverse sections of modified constructions of our improved center sill, taken on the transverse plane 5—5, Fig. 3. Fig. 12 is a plan view of a fragment of our improvements showing a modified construction thereof. Fig. 13 shows yet another modified construction of our improvements.

Referring to the drawings, A represents the end-sill, B the side-sill, C the longitudinal floor timbers, C' the flooring and D, D, the parallel wooden center-sills. The end-sill may have an outer metal face-plate $a$, if desired, and also a wooden buffer-block A' with an outer metal facing, but this construction may be modified or dispensed with altogether in so far as our particular improvements are concerned. When used, however, plate $a$ is held in place, preferably, by longitudinal bolts $a'$ that extend from end to end of the underframe through the end-sill and plate, and are tightened by suitable nuts on their screw-threaded ends, between which and said plate suitable washers $a^2$ are interposed, if desired. The buffer-block is secured in place in a similar manner by bolts $a^3$ that extend longitudinally just alongside the outer side of the center-sills the full length of the underframe and through the buffer-blocks, and they have nuts on their screw-threaded ends to tighten them.

A suitable distance back of the end-sills the underframe is provided with cast or made-up bolsters E, and the longitudinal floor timbers C rest directly upon said bolsters and are bolted or otherwise secured thereto, but the center-sills D rest on and are secured to suitable shaped plates $b, b$, the horizontal portions of which latter extend beyond the outer longitudinal edge of the center-sill and are riveted to the bolsters. The inner longitudinal edges $c$ of these plates are flanged upward and lap against and are sunk into depressions in the under surfaces and in the depressions in the inner vertical surfaces of the center-sills above the bolsters.

Between the bolsters, the center-sills are reinforced by suitable angle-beams G that lap against the under and inner surfaces of the same, and are secured thereto by means of vertically disposed bolts located at suitable intervals apart. At their ends, the vertical portions of these angle-irons G are cut away and terminate a short distance back of the bolsters, but their horizontal portions extend and have their end edges $k$ practically butt against the adjacent longitudinal edge of the upper flange of the bolster.

Between the end edges of the vertical portions of the angle-beams G and the end-sill of the car the inner opposing surfaces of the center-sills are faced by a metal plate H, which latter immediately in front of the bolster is dropped down so that its lower edge is just above the horizontal plane of the under side of the center of the bolster. The part of this plate H, thus increased in depth, extends forward and the upper portion of its forward end is cut away and the lower portion passed under the end-sill and suitably secured to the stirrup d for the draw-bar. Plates H constitute a drop-frame for the support of the draft-rigging of the underframe, and they may be connected by a tie-plate e and, if desired, by a longitudinally disposed supporting-plate J for the followers of the draft-rigging springs (not shown).

Besides the reinforcement of the center-sills by the angle-beams G between the bolsters and plates J, between the ends of said angle-beams G and the end-sills, they are further reinforced and braced practically from one end of the car to the other by an I-beam I. This I-beam is interposed between and connects the center-sill, and it is so disposed that its web is horizontal and its flanges are riveted or otherwise secured to angle-beams G. In the preferred form of our invention, the ends of this I-beam I do not contact with the end-sills, although this could be done, but owing to the way in which the supporting elements of the draft-rigging are assembled this I-beam does not materially strengthen the back-bone of the underframe and assist in transmitting the longitudinal shocks and strains from the draft-rigging at one end of the underframe to the draft-rigging at the other end, in such manner as to greatly relieve the wooden superstructure of the car.

The employment of the I-beam reinforcement between the ends of the car practically results in a single center-sill, and it is the equivalent of the single center-sill in every respect, excepting that it does not impart the shocks and strains that are transmitted through it to the floor of the car in the same manner that a single center-sill would. This I-beam reinforcement may be constructed in a great variety of ways. For instance, as shown in Fig. 5 of the drawings, it may be built up from a web 2 consisting of a flat plate, and flanges 3, 3, consisting of stiffener angle-beams riveted thereto. In Figs. 6 and 8 of the drawings, the built-up I-beam section consists of two corresponding roller steel channels 4, 4, in the former, and two corresponding concaved or bent channels 5, 5, in the latter, placed back to back and riveted together.

In Fig. 7 of the drawings, said I-beam section consists of two steel channels 6, 6, placed back to back and spaced apart by a flat plate filler 7.

In Fig. 9 of the drawings, the built-up I-beam section is shown to consist of a rolled steel channel beam 9 and a concaved plate or bent channel 10,—thus practically combining both features of the section shown in Figs. 6 and 8.

In Fig. 11 of the drawings, the I-beam section is shown to consist of four Z-bars 12, 12 and 13, 13, so combined that one leg of each are arranged parallel to each other with the legs 13 of the lowermost bars sandwiched between the legs of the uppermost bars 12 and then secured together.

In Fig. 13 of the drawings, the built-up I-beam section is shown to consist of an upper channel 14, which has its horizontal web resting upon the upper horizontal branches of corresponding Z-bars 15, 15, the lengths of which correspond to one-half of the distance between center-sills D. Underneath these upper horizontal branches of said Z-bars, a channel-beam 16 is placed, and the web of this lower channel bar and the web of the upper channel bar are secured to the upper horizontal branches of said Z-bars by rivets. The modification shown in Fig. 13 of the drawings practically makes one integral element of that which, in the preferred form of our invention, consisted of the angle-irons G and the I-beams I, and constitutes a very strong and durable element for the reinforcement of the center-sills, and the strengthening of the backbone of the car.

We consider any one of these I-beams, whether solid or built-up, or any other metal element substituted therefor, when combined with the other elements in the manner and for the purpose hereinbefore set forth, as coming within the scope of our invention.

While we much prefer the use of the angle-beams G to reinforce the center-sills D, D, between the bolsters, yet, if desired, and particularly if more resilience is sought, said angle-beams G can be dispensed with and angle-iron brackets K, K, as shown in Fig. 12 of the drawings, substituted therefor and placed at stated intervals apart with their vertical portions riveted to the flanges of the I-beam reinforcements I, and their longitudinal portions bolted or otherwise secured to the center-sills D.

In Figs. 2 and 4 of the drawings, the rear ends of the plate H are shown to extend to and practically abut against the web of the bolster on either side of the center of length of the latter, and to be connected thereto by means of angles M. We prefer this construction because it assembles the various elements of the underframe at the point where the weight of the load is transmitted to the trucks in the vicinity of which the construction should be such as to unite all of the adjacent elements. These angles, however, could be omitted, if desired.

What we claim as new is:

1. An underframe for cars comprising bolsters, a built-up center-sill including a longitudinally disposed I-beam section the web of which is horizontal and which extends from end to end of the underframe over the bolsters, and metal angles the ends of which terminate between the bolsters and to which the flanges of said I-beam section are suitably secured.

2. An underframe for cars comprising bolsters, a built-up center-sill including a longitudinally disposed solid I-beam section, the web of which is horizontally disposed and which extends from end to end of the underframe, and metal angles the ends of which terminate between said bolsters.

3. An underframe for cars comprising bolsters, a built-up center-sill including a longitudinally disposed section extending substantially from end to end of the underframe over said bolsters, and metal angles the ends of which terminate between the bolsters and to which the flanges of said I-beam section are suitably secured.

4. An underframe for cars comprising bolsters, center-sills extending from end to end of the car over said bolsters, a longitudinally disposed I-beam section the web of which is horizontal extending from end to end of the car between said center-sills, and means terminating between said bolsters for connecting the flanges of said I-beam section to said center-sills.

5. An underframe for cars comprising bolsters, built-up center-sills comprising wooden beams extending from end to end of the car over said bolsters and metal beams applied to the inner vertical sides thereof, and a longitudinally disposed I-beam section the web of which is horizontal and which extends from end to end of the car between said center sills and is secured thereto.

6. An underframe for cars comprising bolsters, built-up center-sills comprising wooden beams extending from end to end of the car over said bolsters and metal beams applied to the inner vertical sides thereof, a longitudinally disposed I-beam section the web of which is horizontal and which extends from end to end of the car between said center sills and is secured thereto, and drop-plates interposed between said built-up center-sills and I-beam section that extend from the bolsters to the end-sills.

7. An underframe for cars comprising end-sills, bolsters, center-sills extending from end-sill to end-sill, a longitudinal I-beam section the web of which is horizontal and extends from end to end of the underframe over said bolsters and has its ends terminate adjacent said end-sills, angle-irons interposed between said section and center-sills and terminating between said bolsters and drop-plates interposed between said section and center-sills, and having the lower portion of their rear ends cut away and the upper portion extending backward over the bolsters.

8. An underframe for cars comprising end-sills, bolsters, center-sills extending from end-sill to end-sill, a longitudinal I-beam section the web of which is horizontal and extends from end to end of the underframe over said bolsters, and has its ends terminate adjacent said end-sills, angle-irons interposed between said section and center-sills and terminating between said bolsters and drop-plates interposed between said section and center-sills from the end-sills and having the upper portions of their forward ends cut away and extending forward under the end-sills.

9. An underframe for cars comprising end-sills, bolsters, center-sills extending from end-sill to end-sill, a longitudinal I-beam section the web of which is horizontal and extends over said bolsters and has its ends terminate adjacent said end-sills, angle-irons interposed between said section and center-sills and terminating between said bolsters and drop-plates having their upper portions interposed between and secured to said section and center-sills from the end-sills and terminating between the bolsters and end-sills, and means attached thereto for supporting draft-rigging.

10. An underframe for cars comprising end-sills, bolsters, center-sills extending from end-sill to end-sill, a longitudinal I-beam section extending from end to end of the underframe over said bolsters, and plates interposed between said section and center-sills having the lower portion of their rear ends cut away and said ends extending over the bolsters and having the upper portion of their forward ends cut away and extending under the end-sills.

11. An underframe for cars comprising end-sills, bolsters, center-sills extending from end-sill to end-sill, a longitudinal I-beam section extending between said center-sills over said bolsters, and plates interposed between said section and center-sills from the end-sills having the lower portion of their rear ends cut away and said ends extending over the bolsters and having the upper portion of their forward ends cut away and extending under the end-sills, and means secured thereto for supporting draft-rigging.

12. An underframe for cars comprising end-sills, bolsters, parallel center-sills extending from end-sill to end-sill, a longitudinal I-beam section extending between said center-sills over said bolsters and having its ends terminate adjacent said end-sills, angle-irons interposed between said I-beam section and said center-sills having their ends terminating between said bolsters, and drop-plates interposed between said I-beam sections and said center-sills between the ends of said angle-irons and said end-sills.

13. An underframe for cars comprising end-sills, bolsters, parallel center-sills extending from end-sill to end-sill, a longitudinal I-beam section extending over said bolsters and having its ends terminate adjacent said end-sills, angle-irons interposed between said I-beam section and said center-sills having their ends terminating between said bolsters and having the under part of their rear portions cut away and extending over said bolsters from the ends of said angle-irons to said end-sills.

14. An underframe for cars comprising end-sills, bolsters, center-sills extending from end-sill to end-sill, a longitudinal I-beam section extending from end to end of the underframe over said bolsters and having its ends terminate adjacent said end-sills, angle irons located between the bolsters and secured to the inner sides of the center-sills, and having the flanges of said I-beam section secured thereto, and drop-plates interposed between said section and center-sills and extending rearwardly from said end-sills and having the lower portions of their rear ends cut away and the upper portions extending backward over the bolsters.

15. An underframe for cars comprising end-sills, bolsters, center-sills extending from end-sill to end-sill, the longitudinal I-beam section extending over said bolsters and having its ends terminate adjacent said end-sills, angle-irons located between the bolsters and secured to the inner sides of said center-sills and having the flanges of said I-beam section secured thereto, and drop-plates interposed between said I-beam section and center-sills and having their rear ends terminate adjacent said bolsters and the upper portions of their forward ends cut away and extending forward under the end-sills.

16. An underframe for cars comprising end-sills, bolsters, center-sills extending from end-sill to end-sill, a longitudinal I-beam section having its web horizontal extending from end to end of the underframe over said bolsters, and angle-irons located between the bolsters and secured to the inner sides of the center-sills, and having the flanges of said I-beam section secured thereto, and drop-plates having the lower portions of their rear ends cut away and said rear ends extending over the bolsters and having the upper portions of their forward ends cut away and extending under the end-sills.

17. An underframe for cars comprising end-sills, bolsters, center-sills extending from end-sill to end-sill, a longitudinal I-beam section extending over said bolsters having its ends terminate adjacent said end-sills and its web horizontal and connecting said center-sills, and horizontal tie-plates interposed between said bolsters and center-sills having their inner longitudinal edges flanged upward and lapping against and secured to the inner vertical surfaces of said center-sills.

18. An underframe for cars comprising end-sills, bolsters, center-sills extending from end-sill to end-sill, a longitudinal I-beam section extending over said bolsters having its ends terminate adjacent said end-sills and its web horizontal and connecting said center-sills, drop-plates interposed between said I-beam section and center-sills and extending from the end-sills back over and terminating adjacent said bolsters, and horizontal tie-plates interposed between said bolsters and center-sills having their inner longitudinal edges flanged upward between said drop-plates and center-sills and secured thereto.

19. An underframe for cars comprising bolsters, end-sills, a built-up center-sill including parallel longitudinal wooden beams extending from end-sill to end-sill, metal angles lapping against and secured to the under and inner surfaces of said wooden beams between the bolsters, and a longitudinally disposed I-beam section the web of which is horizontal and which extends from end-sill to end-sill over the bolsters and has its flanges connected to said metal angles and wooden beams.

20. An underframe for cars comprising bolsters, a built-up center-sill including a longitudinally disposed I-beam section extending from end to end of the underframe over said bolsters, and parallel longitudinal wooden beams extending from end to end of the car, and metal angles secured to the inner sides of said wooden beams and terminating adjacent the bolsters and to which the flanges of said I-beam section are suitably secured.

In witness whereof we have hereunto set our hands this 8th day of May, 1914.

EDWIN G. CHENOWETH.
JULIUS J. ACKER.
GEORGE A. HULL.

Witnesses:
 FRANK D. THOMASON,
 FLORENCE MITCHELL.

---

Copies of this patent may be obtained for five cents each, by addressing the "Commissioner of Patents, Washington, D. C."